United States Patent
Waldrop et al.

(10) Patent No.: US 8,509,249 B2
(45) Date of Patent: Aug. 13, 2013

(54) PROCESS AND SYSTEM FOR AN INTEGRATED CARRIER ETHERNET EXCHANGE

(75) Inventors: Craig Alan Waldrop, Broomfield, CO (US); Sukwan Youn, Fremont, CA (US); Lane Gordon Patterson, San Jose, CA (US); Kirk Felbinger, San Jose, CA (US)

(73) Assignee: Equinix, Inc., Redwood City, CA (US)

( * ) Notice: Subject to any disclaimer, the term of this patent is extended or adjusted under 35 U.S.C. 154(b) by 226 days.

(21) Appl. No.: 12/875,039

(22) Filed: Sep. 2, 2010

(65) Prior Publication Data

US 2011/0058547 A1    Mar. 10, 2011

Related U.S. Application Data

(60) Provisional application No. 61/285,371, filed on Dec. 10, 2009, provisional application No. 61/239,997, filed on Sep. 4, 2009, provisional application No. 61/323,066, filed on Apr. 12, 2010.

(51) Int. Cl.
*H04L 12/28* (2006.01)
*H04L 12/56* (2006.01)

(52) U.S. Cl.
USPC ............... 370/401; 370/395.53; 370/389

(58) Field of Classification Search
USPC .................. 370/389, 395.53, 401
See application file for complete search history.

(56) References Cited

U.S. PATENT DOCUMENTS

| | | | |
|---|---|---|---|
| 5,170,391 A * | 12/1992 | Arnold et al. | ......... 370/232 |
| 6,345,239 B1 | 2/2002 | Bowman-Amuah | |
| 6,873,620 B1 * | 3/2005 | Coveley et al. | ......... 370/395.31 |
| 7,096,193 B1 | 8/2006 | Beaudoin et al. | |
| 7,577,154 B1 | 8/2009 | Yung et al. | |
| 2001/0034789 A1 * | 10/2001 | Kumagai et al. | ......... 709/233 |

(Continued)

FOREIGN PATENT DOCUMENTS

| EP | 2066081 A1 | 6/2009 |
|---|---|---|
| WO | WO 2011/029030 A1 | 3/2011 |

OTHER PUBLICATIONS

Cross Reference to Related Applications Under 37 C.F.R. § 1.78, 2 pages, Jul. 29, 2011.
Asante, Configuration of VLANS, pp. 1-8, Oct. 2008.

(Continued)

*Primary Examiner* — Ronald Abelson
(74) *Attorney, Agent, or Firm* — Rutan & Tucker, LLP

(57) ABSTRACT

An Ethernet exchanger is coupled to two or more Ethernet networks to exchange information among the two or more Ethernet networks using virtual circuits. A first Ethernet network is associated with a first carrier and a first port of the Ethernet exchanger. A second Ethernet network is associated with a second carrier and a second port of the Ethernet exchanger. Network information of the first Ethernet network and network information of the second Ethernet network are provided by the respective first carrier and the second carrier and stored in a database. A virtual circuit is provisioned to interconnect the first Ethernet network and the second Ethernet network based on a partnership between the first carrier and the second carrier and based on the stored information about the first network and the second network. The virtual circuit is associated with the first port and the second port. The stored information about the first network or the second network is reusable for subsequent provisioning of other virtual circuits associated with the first carrier or the second carrier.

20 Claims, 15 Drawing Sheets

(56) References Cited

U.S. PATENT DOCUMENTS

| | | | |
|---|---|---|---|
| 2002/0083179 | A1 | 6/2002 | Shaw et al. |
| 2003/0055731 | A1 | 3/2003 | Fouraker et al. |
| 2003/0149653 | A1 | 8/2003 | Penney et al. |
| 2004/0081116 | A1* | 4/2004 | Clay ............................ 370/321 |
| 2004/0111429 | A1 | 6/2004 | Bou-Ghannam et al. |
| 2004/0228354 | A1 | 11/2004 | Anschutz et al. |
| 2005/0185654 | A1* | 8/2005 | Zadikian et al. ......... 370/395.21 |
| 2006/0002370 | A1 | 1/2006 | Rabie et al. |
| 2006/0028998 | A1* | 2/2006 | Lioy et al. ..................... 370/252 |
| 2006/0114915 | A1 | 6/2006 | Kalkunte et al. |
| 2006/0245557 | A1 | 11/2006 | Paden et al. |
| 2006/0288106 | A1 | 12/2006 | Kumar et al. |
| 2007/0071029 | A1* | 3/2007 | White et al. .................. 370/466 |
| 2007/0291716 | A1 | 12/2007 | Morales Barroso |
| 2007/0291914 | A1 | 12/2007 | Berge et al. |
| 2008/0049621 | A1 | 2/2008 | McGuire et al. |
| 2008/0049748 | A1 | 2/2008 | Bugenhagen et al. |
| 2008/0062876 | A1 | 3/2008 | Giroux et al. |
| 2008/0107117 | A1* | 5/2008 | Kulkarni et al. ........... 370/395.2 |
| 2008/0144632 | A1* | 6/2008 | Rabie et al. ................ 370/395.5 |
| 2008/0151907 | A1 | 6/2008 | Ge et al. |
| 2008/0244150 | A1* | 10/2008 | Sharma ......................... 710/316 |
| 2009/0073988 | A1 | 3/2009 | Ghodrat et al. |
| 2009/0141703 | A1 | 6/2009 | Ghodrat et al. |
| 2009/0161569 | A1 | 6/2009 | Corlett |
| 2010/0002591 | A1 | 1/2010 | Mizutani et al. |
| 2010/0008365 | A1 | 1/2010 | Porat |
| 2010/0318918 | A1* | 12/2010 | Mahmoodshahi ............ 715/744 |
| 2011/0058565 | A1 | 3/2011 | Waldrop et al. |
| 2011/0060657 | A1 | 3/2011 | Waldrop et al. |
| 2011/0060846 | A1 | 3/2011 | Waldrop et al. |
| 2011/0145399 | A1 | 6/2011 | Jeyapaul et al. |
| 2011/0268435 | A1 | 11/2011 | Mizutani et al. |
| 2012/0106321 | A1 | 5/2012 | Alon et al. |

OTHER PUBLICATIONS

IEEE Std 802.1q—2005, *IEEE Standard for Local and metropolitan Area Networks—Virtual Bridged Local Area Networks: Provider Bridges*, 303 pages, May 2006.
PCT/US2010/047862 filed Sep. 3, 2010 Search Report dated Oct. 28, 2010.
PCT/US2010/047862 filed Sep. 3, 2010 Written Opinion dated Oct. 28, 2010.
PCT/US2010/047871 filed Sep. 3, 2010 Search Report dated Oct. 26, 2010.
PCT/US2010/047871 filed Sep. 3, 2010 Written Opinion dated Oct. 26, 2010.
PCT/US2010/047878 filed Sep. 3, 2010 Search Report dated Nov. 16, 2010.
PCT/US2010/047878 filed Sep. 3, 2010 Written Opinion dated Nov. 16, 2010.
PCT/US2010/047884 filed Sep. 3, 2010 Search Report dated Oct. 28, 2010.
PCT/US2010/047884 filed Sep. 3, 2010 Written Opinion dated Oct. 28, 2010.
PCT/US2010/059973 filed Dec. 10, 2010 Search Report dated Feb. 8, 2011.
PCT/US2010/059973 filed Dec. 10, 2010 Written Opinion dated Feb. 8, 2011.
The Metro Ethernet Forum, MEF 4, *Metro Ethernet Network Architecture Framework—Part 1: Generic Framework*, May 2004.
The Metro Ethernet Forum, Metro Ethernet Networks—A Technical Overview, 17 pages, version 2.1, Copyright 2002-2004.
The Metro Ethernet Forum, Technical Specification MEF 11, User Network Interface (UNI) Requirements and Framework, 34 pages, Nov. 2004.
The Metro Ethernet Forum, Technical Specification MEF 26, External Network Network Interface (ENNI)—Phase 1, 57 pages, Jan. 2010.
Non-Final Office Action for U.S. Appl. No. 12/875,054 mailed Jun. 15, 2012, 22 pages.
International Preliminary Report on Patentability for PCT/US10/47862, dated Mar. 6, 2012, 9 pages.
International Preliminary Report on Patentability for PCT/US10/47871, dated Mar. 6, 2012, 7 pages.
International Preliminary Report on Patentability for PCT/US10/47878, dated Mar. 6, 2012, 7 pages.
International Preliminary Report on Patentability for PCT/US10/47884, dated Mar. 6, 2012, 10 pages.
International Preliminary Report on Patentability for PCT/US10/59973, dated Jun. 12, 2012, 6 pages.
Non-Final Office Action for U.S. Appl. No. 12/875,048 mailed Dec. 17, 2012, 18 pages, U.S. Patent and Trademark Office, Alexandria, Virginia, United States of America.
Non-Final Office Action for U.S. Appl. No. 12/875,039 mailed Nov. 19, 2012, 22 pages, U.S. Patent and Trademark Office, Alexandria, Virginia, United States of America.
Non-Final Office Action for U.S. Appl. No. 12/875,042 mailed Dec. 20, 2012, 23 pages, U.S. Patent and Trademark Office, Alexandria, Virginia, United States of America.

* cited by examiner

PROCESS AND SYSTEM FOR AN INTEGRATED CARRIER ETHERNET EXCHANGE

RELATED APPLICATIONS

This application claims the benefit of and priority to all three: 1) U.S. Provisional Application titled "ETHERNET EXCHANGE" filed on Dec. 10, 2009 having application Ser. No. 61/285,371 and is incorporated herein by reference in its entirety; 2) U.S. Provisional Application titled "PRIVATE NETWORK CONNECTIVITY PLATFORM" filed on Sep. 4, 2009 having application Ser. No. 61/239,997 and is incorporated herein by reference in its entirety; and 3) U.S. Provisional Application titled "ETHERNET EXCHANGE" filed on Apr. 12, 2010 having application Ser. No. 61/323,066 and is incorporated herein by reference in its entirety.

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

Embodiments of the invention generally relate to network connectivity in a many to many connection environment. More particularly, an aspect of an embodiment of the invention relates to interconnecting Ethernet networks from multiple private carriers.

BACKGROUND OF THE INVENTION

One of the challenges that many network carriers face is how to make their services available to their customers at competitive costs. The customers may be located anywhere, and it can be cost prohibitive for each carrier to install their own end-to-end wiring to service these customers. Many carriers already have existing high speed networks (e.g., fiber) in many metropolitan areas. As such, it is possible for one carrier to connect to an existing network of another carrier. This type of connection is referred to as Direct Network to Network Interconnection (D-NNI). Typically, the D-NNI approach is very complex and time consuming. It takes a lot of time for the two carriers to negotiate an agreement and for their engineering teams to come up with a solution. The process is repeated whenever a connection with another carrier is required, making it very inefficient and costly.

SUMMARY OF THE INVENTION

For some embodiments, an Ethernet exchanger is configured to provision virtual circuits that connect Ethernet networks from a plurality of carriers based on one-to-many or many-to-many topologies. Each of the plurality carriers is associated with one or more ports of the Ethernet exchanger. Detailed information about each carrier is collected via a web-based user interface and stored in a relational and searchable database for repeated uses. The web-based user interface may be used to allow a carrier to offer its services to other carriers. The web-based user interface may also be used to allow a carrier to request for services. Based on two or more carriers having an agreement to sell and buy services, the web-based user interface may be used to request the Ethernet exchanger to provision a virtual circuit. Once the virtual circuit is provisioned, the Ethernet exchanger is configured to translate frames between the Ethernet networks of the two carriers and to monitor and trouble shoot issues about the virtual circuit.

BRIEF DESCRIPTION OF THE DRAWINGS

The drawings refer to embodiments of the invention in which.

DETAILED DISCUSSION

Figure 1A:
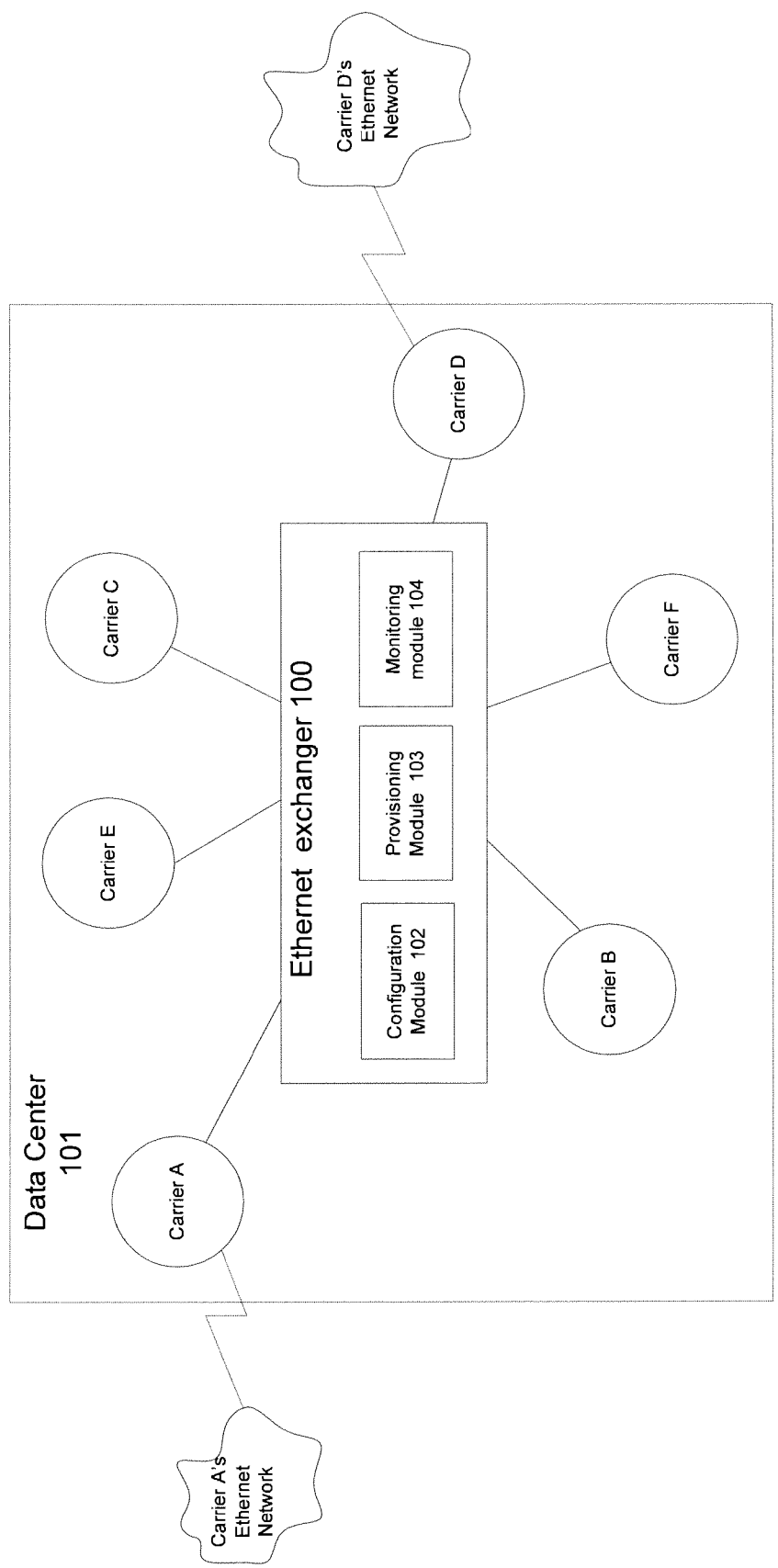
FIG. 1A is a block diagram that illustrates a high-level view of a data center equipped with an Ethernet exchanger, in accordance with some example embodiments.

According to some embodiments, a platform is provided to enable a plurality of carriers to interconnect their Ethernet networks. The platform includes an Ethernet exchanger. Each carrier is coupled to the Ethernet exchanger via a connection point. The Ethernet exchanger is configured to map and translate frames or packets among the carriers across their respective connection points. Mapping and translating operations are based on information provided by the carriers using a web-based user interface associated with the Ethernet exchanger.

In the following description, numerous specific details are set forth, such as examples of specific data signals, named components, connections, amount of private carriers connected to the switch fabric, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as first private carrier, may be made. However, the specific numeric reference should not be interpreted as a literal sequential order but rather interpreted that the first private carrier is different than a second private carrier. Thus, the specific details set forth are merely exemplary. The specific details may be varied from and still be contemplated to be within the spirit and scope of the present invention. The term "coupled" is defined as meaning connected either directly to the component or indirectly to the component through another component.

Overview

An Ethernet exchanger is a system that is designed to address growing demand for Ethernet services by enabling carriers to interconnect and to expand their services globally. The Ethernet exchanger may be part of an overall physical Ethernet switch fabric which may include one or more Ethernet exchangers to support single connections as well as redundant connections.

The Ethernet exchanger is configured to be used by the carriers as a common point for External network-to-network interconnection (E-NNI). One implementation of the E-NNI may be an Equinix Carrier Ethernet Exchange™ provided by Equinix, Inc. headquartered in Foster City, Calif. The Ethernet exchanger streamlines and simplifies the process of partnering the carriers in a transparent and neutral manner. One example application of an Ethernet exchanger is a co-location and interconnecting data center where many carriers already have their presence. This allows the participating carriers to have a wide range of interconnectivity options in the same facility. The Ethernet exchanger includes ports for two or more carriers to connect their network wirings. This enables a carrier to have options to create many-to-many interconnections with only one-time hook up to the switch fabric, one-time creation of a customer account with the switch fabric, and one-time providing description of its network characteristics using an on-line web interface associated with the switch fabric. The customer account may include the user profile information. The Ethernet exchanger enables the usage of already entered or known information thus simplifying the interconnecting process by avoiding the needs to repeatedly requiring the carriers to enter their information for every connection.

FIG. 1A is a block diagram that illustrates a high-level view of a data center equipped with an Ethernet exchanger, in accordance with some example embodiments. Ethernet exchanger 100 provides a neutral connectivity platform to allow carriers to interconnect their networks (also referred to as carrier Ethernet networks or "CEN"s). The Ethernet exchanger 100 is neutral because it is not biased to any carriers and only provides the interconnectivity service after the carriers become partners. The Ethernet exchanger 100 may be deployed in locations where many carriers already have their equipments such as, for example, data center 101. Each carrier may only need to have one connection to the Ethernet exchanger. In the current example, each of the carriers A-F has one connection to the Ethernet exchanger 100.

By being connected to the Ethernet exchanger 100, a carrier can purchases services and reach out to many end users in many different geographical areas without incurring the same expenses typically associated with having multiple D-NNIs. For example, the carrier A can expand its services using the carrier D's Ethernet network. By connecting to the Ethernet exchanger 100, a carrier may be able to generate additional revenue by offering to sell its network services to the other carriers. For example, the carrier D can offer the opportunity to use the carrier D's network to the other carriers.

Figure 1B:
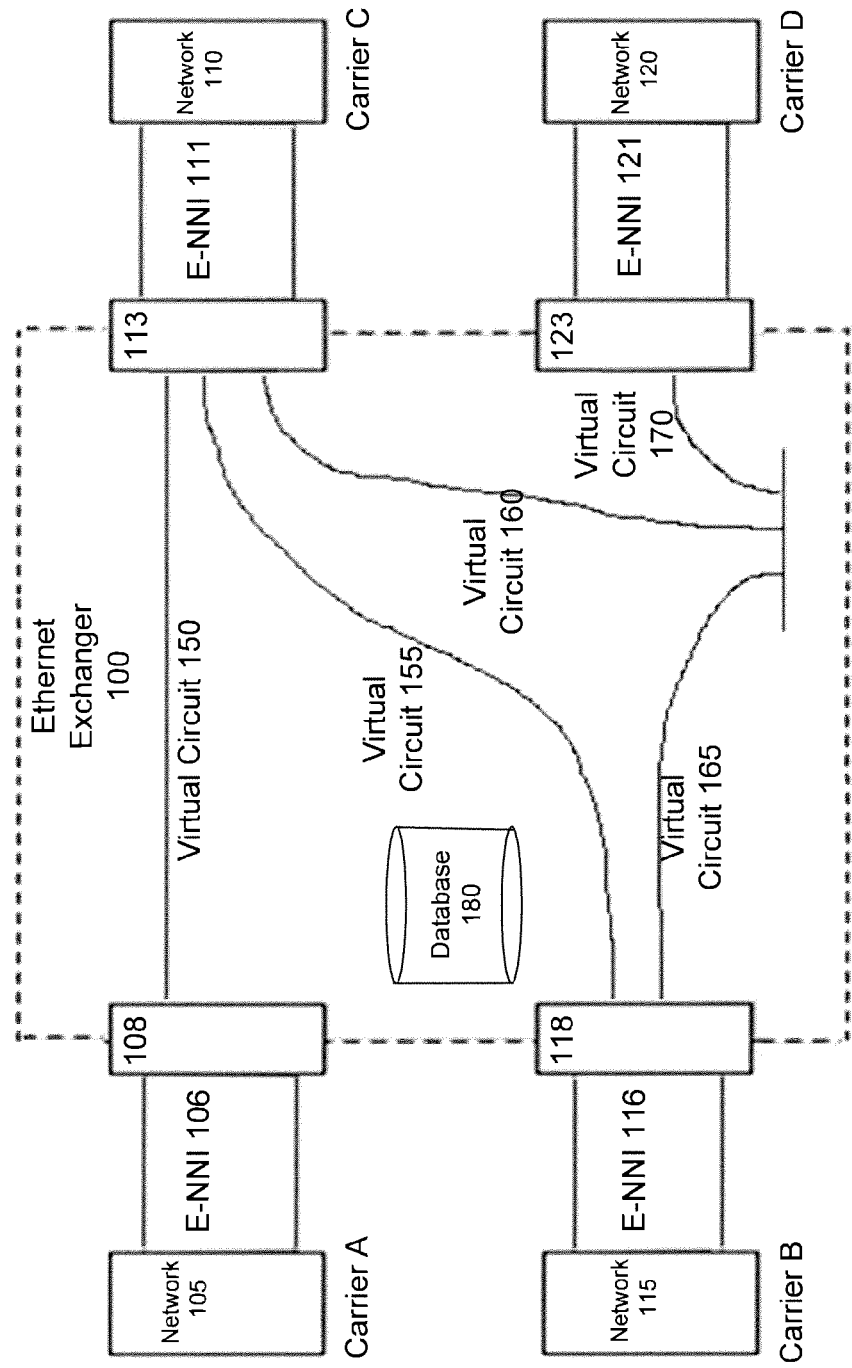
FIG. 1B is a block diagram that illustrates an example of an Ethernet exchanger, in accordance with some embodiments.

FIG. 1B is a block diagram that illustrates an example of an Ethernet exchanger, in accordance with some embodiments. The Ethernet exchanger 100 may include Gigabit Ethernet (Gig-E) ports and 10 Gig-E ports such as, for example, ports 108, 113, 118 and 123. In one example, the Ethernet exchanger 100 may be implemented using a 12-slot Alcatel-Lucent 7450 ESS-12 and one or more Alcatel-Lucent 7750 Service Routers (SR) of Alcatel-Lucent headquartered in Paris, France. Each of the ports (also referred to as a physical connection) of the Ethernet exchanger 100 may support thousands of virtual circuits (also referred to logical connections).

The Ethernet exchanger 100 may be configured to include a configuration module 102, a provisioning module 103, and a monitoring module 104. These modules may be implemented using software scripted routines, hardware logic and any combination of both. The provisioning module 103 may provision virtual circuits based on receiving virtual circuit requests. The configuration module 102 may map and translate Ethernet services among the carriers.

The Ethernet exchanger 100 may offer application programming interfaces (APIs) to exchange information with other applications such as, for example, the web-based user interface used by the participating carriers. In the following discussions, the phrases "participating carriers" "qualified carriers" or "carriers" refer to the carriers who have agreements with a provider of the Ethernet exchange services such as, for example, Equinix, Inc.

The Ethernet exchanger 100 may also be configured to include a monitor module 104 which may be implemented using software scripted routines, hardware logic and any combination of both. The monitor module 104 may monitor the status of the virtual circuits and provide status information to the carriers. As mentioned above, the communication with the carriers may be via the web-based user interface. Some examples of network management software used by the monitoring module 102 may include operation support systems (OSS) and simple network management protocol (SNMP). OSS and SNMP are network management protocols used to manage communications networks. The monitor module 104 may be configured to use APIs to exchange information with network management software used by the carriers.

The Ethernet exchanger 100 may support multiple E-NNIs. Each of the E-NNIs is coupled to a port. For example, each of the ports 108, 113, 118 and 123 is coupled to each of the E-NNI 106, E-NNI 111, E-NNI 116, and E-NNI 121, respectively. In the example illustrated in FIG. 1B, the Ethernet services of carrier A and carrier C are mapped and translated across virtual circuit 150. This allows Ethernet traffic to flow between network 105 and network 110. Likewise, the Ethernet services of carrier B and carrier C are mapped and translated across virtual circuit 155. This allows Ethernet frames to be exchanged between network 115 and network 110.

The Ethernet exchanger 100 is configured to support point-to-point connections as well as multipoint connections. In a point-to-point connection, the Ethernet exchanger 100 establishes a virtual circuit that connects networks from two carriers. In a multipoint connection, the Ethernet exchanger 100 establishes virtual circuits that connect networks from many carriers. For example, the virtual circuit 150 is part of a point-to-point connection. The virtual circuits 155, 160, 165 and 170 are parts of multipoint connections. The Ethernet exchanger 100 may map and translate Ethernet services between and among the many Ethernet networks connected by the virtual circuits.

Figure 1C:
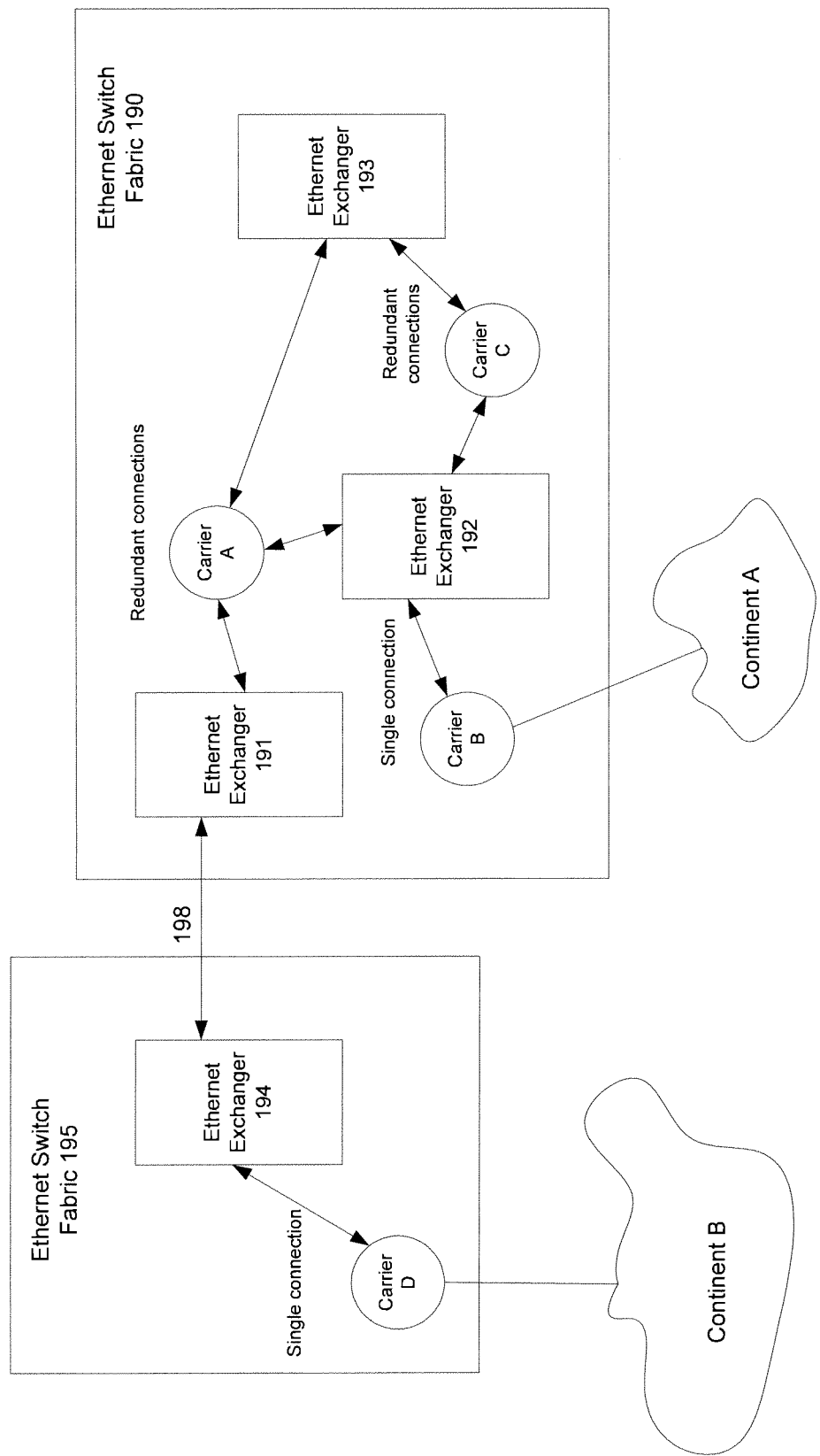
FIG. 1C is a block diagram that illustrates examples of various interconnectivity options available to the carriers, in accordance with some Embodiments.

FIG. 1C is a block diagram that illustrates examples of various interconnectivity options available to the carriers, in accordance with some embodiments. The example illustrates two Ethernet switch fabrics 190 and 195. The Ethernet switch fabric 190 may be located in one metropolitan area while the Ethernet switch fabric 195 may be located in another metropolitan area. Both are communicatively coupled via, for example, high-speed connection 198. The Ethernet switch fabric 190 includes three Ethernet exchangers 191, 192 and 193. An example of redundant connections is illustrated with the carrier A having connections to all three Ethernet exchangers 191, 192 and 193. Similarly, the carrier has redundant connections to the Ethernet exchangers 192 and 193. An example of single connection is illustrated with the carrier B and the carrier D, having a connection to the Ethernet exchanger 192 and 194 respectively.

FIG. 1C also illustrates one advantage of a carrier using an Ethernet exchanger to expand its services in distant geographical areas. The Ethernet switch fabric 190 may be located in a metropolitan area of one continent (e.g., North America). The Ethernet switch fabric 195 may be located in a metropolitan area of another continent (e.g., Europe). By participating in the Ethernet switch fabric platform, the carrier A may be able to offer Ethernet services to clients/end users located in the continent where the carrier D has its presence.

Web Portal

For some example embodiments, the web-based user interface may be configured to present a questionnaire in the form of templates to solicit information from the carriers. The templates are web-based and may be presented as a web page or part of a web page. The templates solicit carrier information and direct that solicited information into fields of the database. The web-based user interface cooperates with the physical switch fabric of the Ethernet exchanger to provide the carriers a standardized interconnecting process. The web-based user interface is referred to herein as a web portal or online web portal because it may be a website that offers many services to the carriers including, for example, buy, sell, order, emails, register, etc. However, the terms may be used interchangeably.

Figure 2:
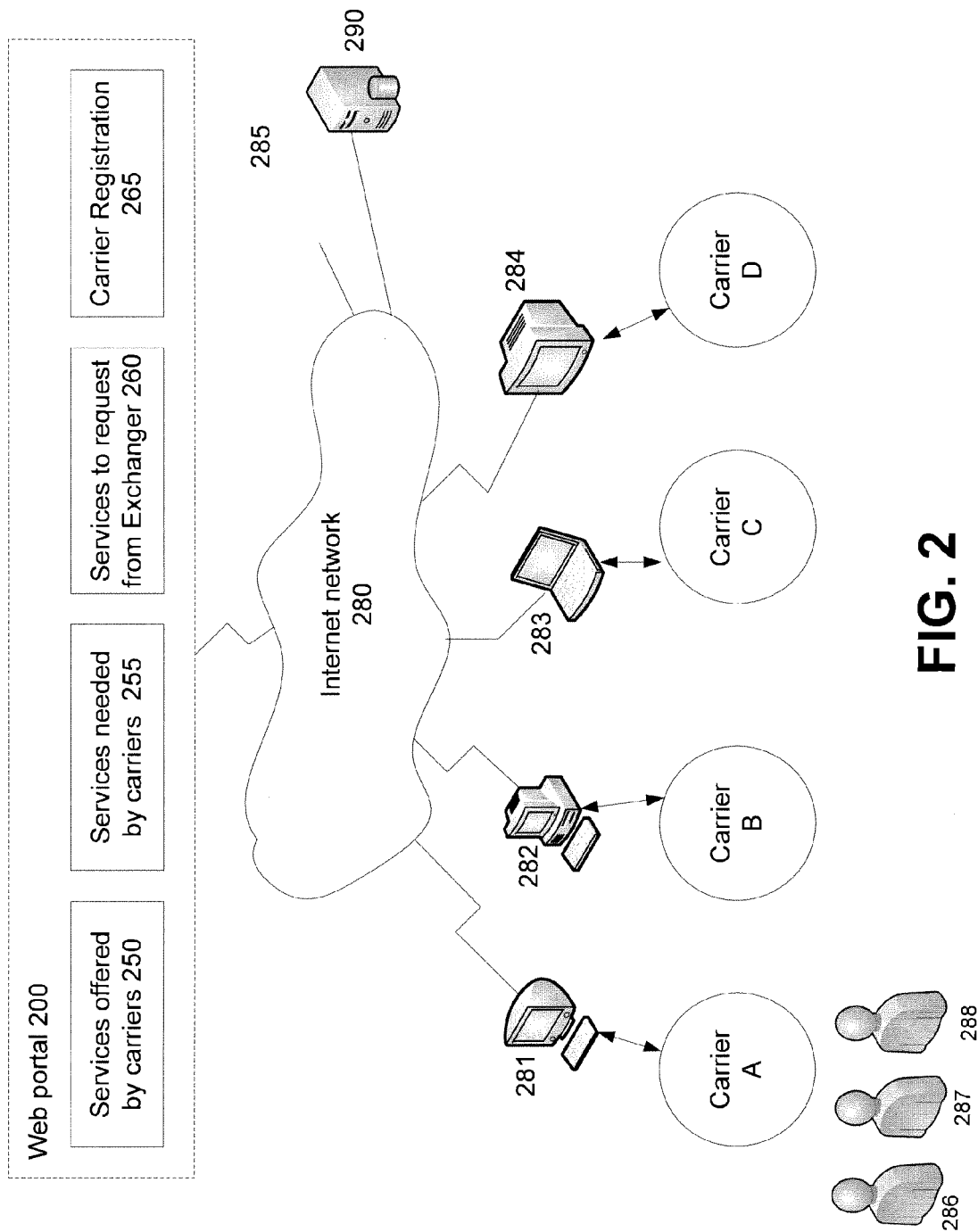
FIG. 2 is a diagram that illustrates one example of the options available to the carriers in a web portal, in accordance with some embodiments.

FIG. 2 is a diagram that illustrates one example of the options available to the carriers in a web portal, in accordance with some embodiments. In this example, web portal 200 may be communicatively coupled to Internet network 280. The web portal 200 may be associated with a computer system that may be coupled to a server system 285 and a database system 290. The server system 285 and the database system 290 are coupled to the Internet 280 and may be combined into one system, or they may be separate systems. The database system 290 and the database system 190 (illustrated in FIG. 1B) may be one or separate systems. The web portal 200 may run as a web-based application on the server system 285. The database system 290 may be configured to store information used by the web portal 200 or information collected by the web portal 200.

The carriers may use computer systems to access the web portal 200 to communicate with one another and to interact with the underlying Ethernet switch fabric such as, for example, switch fabric 190 (illustrated in FIG. 1C). For example, the carriers A-D may use client computer systems 281-284 respectively to connect to the web portal 200 via the Internet 280. The web portal 200 may include a register option to allow a carrier to register and become a participant. For example, a carrier (or carrier representative, user, etc.) may use button 265 to register and to provide information about its networks and services. The carrier may need to provide the information via a series of one or more templates.

Information provided with the templates may be used for service mapping and provisioning as well as any specific extensible markup language (XML) API translations for web services consumption. XML APIs are APIs that are coded using XML. The web portal includes codes that are scripted to automate interaction with the underlying switch fabric, service mapping and/or any logical translation based on XML API and web interface. Each template may be presented by the web portal 200 as a web page or a pop-up window. The information solicited from the carriers may include information about their networks such as, for example:

Footprint and Lit building list
  Service metro area
  Building connection bandwidth
  Ethernet service type and topology
  Supporting Maximum Transmission Unit (MTU) size
  Supporting VLAN frame type with tag protocol identifier (TPID)
  Network protocol information
  Ethernet operation and management (OAM) capability
  Contact and Escalation information For some embodiments, the lit building information may be entered directly using the web portal 200. Alternatively, the lit building information may be submitted and processed as a batch operation. This batch processing may make it easier for those carriers that have many lit buildings or those carriers that have lit building information stored in formats that are not easily extracted. For some embodiments, the batch processing is performed using an API associated with the web portal 200.

Many of the fields in the template may correspond to fields of a searchable relational database such as, for example, database 290. The templates may be standardized so that they can be used for all carriers. This is advantageous because there is no need to have different set of questions for different carriers as is typically used in the D-NNIs. In addition, a carrier may only need to provide the information about its network once regardless of how many other networks that the carrier may be interconnected with. Information associated with a carrier may be grouped together as a carrier profile. Each carrier profile may be unique. In addition to storing the carrier profiles, the database 290 may also be configured to store other information that may be used by the web portal 200.

The Ethernet exchanger 100 is configured as a transparent aggregation translator between the private Ethernet networks of the carriers. The web portal 200 may be configured to present the templates to a user or representative of the carrier on a client machine to allow the user to create a user profile for its carrier and associated Ethernet network. The user profile may include services offered by the carrier. The configuration module of the Ethernet exchanger 100 may be configured to extract and store this information in the database. The information from all of the users is aggregated to provide complete and relevant information in response to a search query generated by other users using the online web portal 200. The database may be associated with intelligent routines to discover the queried information and present the aggregated information to the user that is relevant to the query of the user. The information may include a list of a carrier's Ethernet buildings by capacity, price, service level, etc. The information may also include lit building list. The templates enable the collection, the extraction, and the storing of the information into the relational database. The database is configured to store, aggregate and makes the aggregated information searchable and publishable.

The web portal 200 provides a medium that allows a carrier to interact, showcase, and sell its services to other carriers. It allows a carrier to specify information or services that it wants to offer to other carriers and to learn about other carriers' services. This enables the carriers to qualify each other as partners and to form relationships with one another. For example, a carrier may use the button 250 to describe services that it is willing to offer to potential partners. Similarly, a carrier may use button 255 to specify services that it is searching for.

For some embodiments, the information about the services being searched for may be presented in the form of a request for quote (RFQ). For example, the carrier A may use the web portal 200 to search, view and identify services offered by the carrier D. A representative of the carrier A may use the button 255 to generate an RFQ and cause the RFQ to be sent to the carrier D. When a representative of the carrier D is signed on to the web portal, an RFQ notification is displayed. For some embodiments, the account information or the profile information stored in the relational database may be used to populate fields of the RFQ.

Negotiations between the carrier A and the carrier D may then take place. For some embodiments, the carriers may negotiate among themselves, and then use the web portal 200 to enter the details of their agreements. When there is an agreement between the carrier A and the carrier D, the carrier A may use the button 260 to request the underlying switch fabric and Ethernet exchanger to provision the services.

Figure 9:
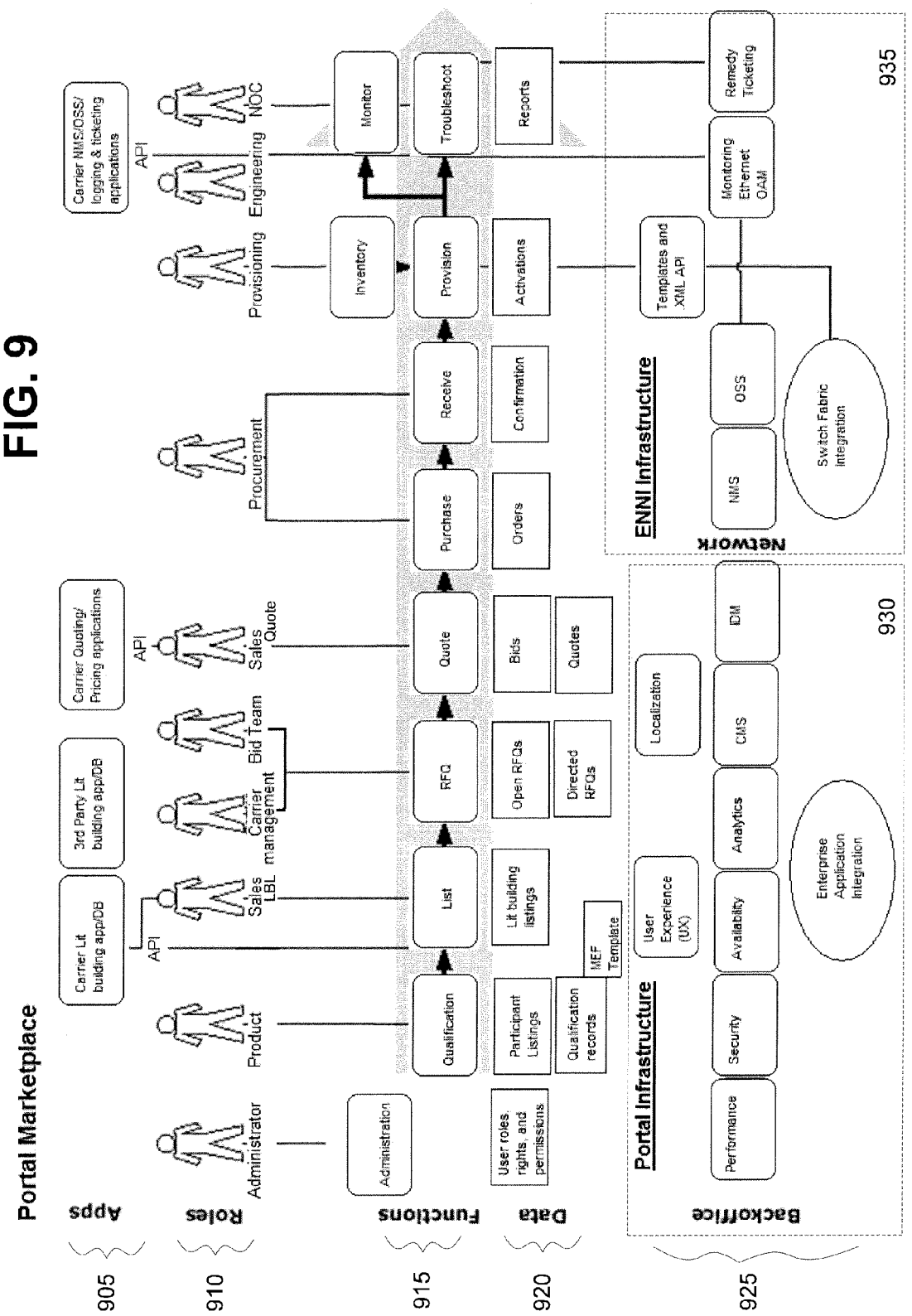
FIG. 9 illustrates an overall example diagram of a representation of a marketplace that includes a web portal and an External Network-to-Network Interface (E-NNI), in accordance with some example embodiments While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

For some embodiments, each carrier may use the web portal 200 to configure and assign representatives to different roles (see FIG. 9 for examples of roles). One representative may be assigned an administrator role and serve as an administrator. The administrator may then assign other representatives from the carrier to other roles such as, for example, sales, engineering, product support, technical support, etc. (illustrated as representatives 286, 287 and 288). Each role may be associated with a different level of access and/or a different level of capabilities. For example, only a sale representative may review the agreements of that carrier, and only a technical support representative may be able to access the network management information.

Provisioning, Mapping and Translation

The Ethernet exchanger 100 is configured to perform interconnection service that aggregates and translates private Ethernet services from the many participating carriers. It provides a many-to-many Layer 2 Network-to-Network Interface (NNI) and standardizes the network-to-network connection process. The Ethernet exchanger is configured to distribute and support multi-regional Ethernet connections among many private networks from a central Ethernet switching fabric. Carrier information from all of the Ethernet networks connected to the Ethernet exchanger is aggregated and stored in the database.

For some embodiments, the configuration module 102 (as illustrated in FIG. 1A) is configured to act as an agent to convert protocols, bandwidth requirements, etc. between the various participating carriers. The Ethernet exchanger 100 is also configured to use APIs to work with a multitude of proprietary systems APIs. The configuration module 102 may include logic and/or software routines to do the handshaking, mapping, and conversion between the different Ethernet protocols independent of the type of Ethernet protocol or network configuration parameters used in either Ethernet network. Following are some examples of the operations that may be performed by the configuration module 102:

Service VLAN ID translation within multiple network environments

Service VLAN frame translation within multiple network environments

Service MTU adaptation within multiple network environments

Service VLAN TPID translation within multiple network environments

Bandwidth protection within E-NNI Fabric

QoS traverse within E-NNI Fabric

Figure 3A:
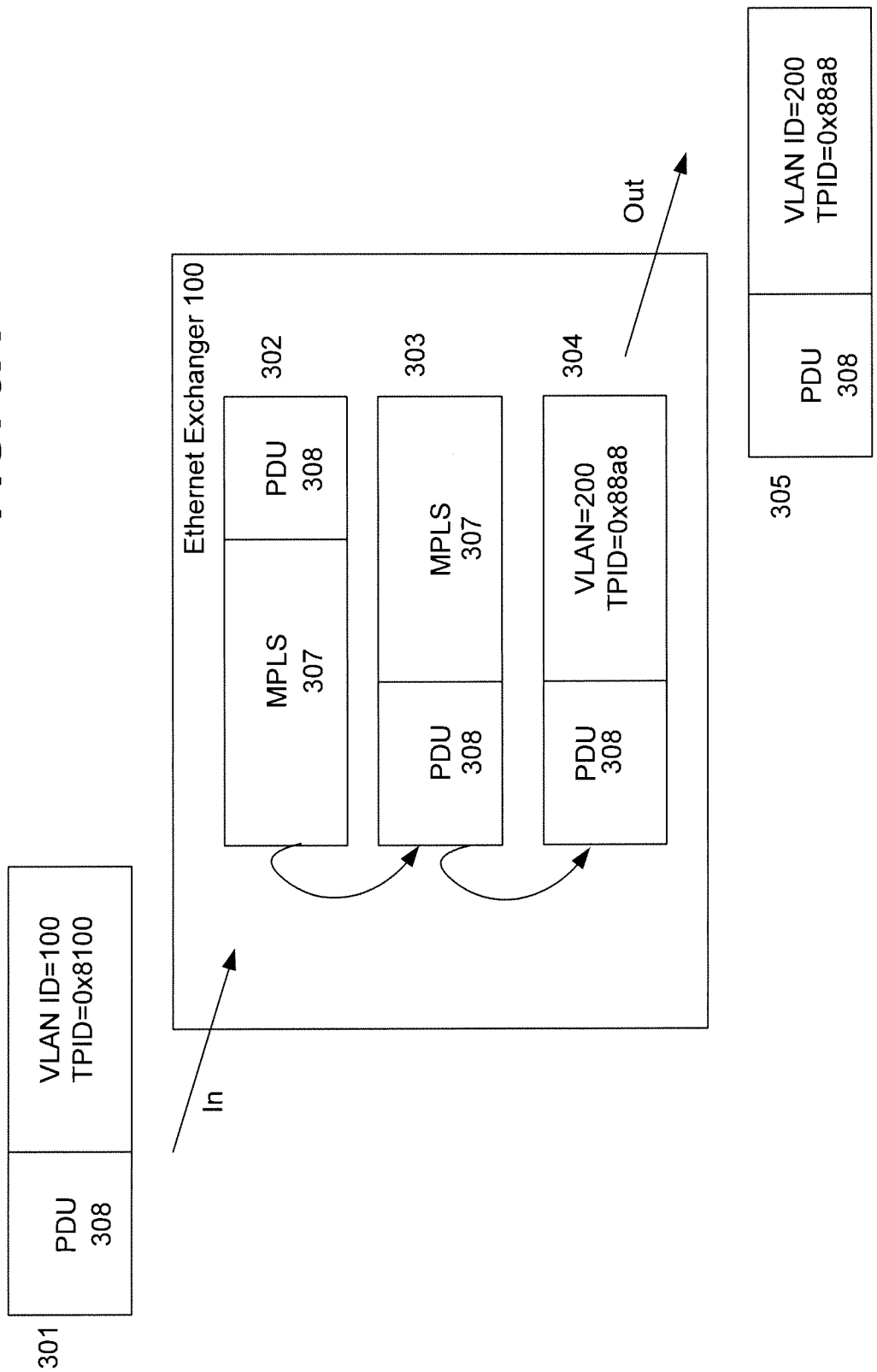
FIG. 3A is a block diagram that illustrates an example of Ethernet frame translation, in accordance with some embodiments.

FIG. 3A is a block diagram that illustrates an example of Ethernet frame translation, in accordance with some embodiments. The Ethernet exchanger 100 is configured to translate frames received from one network into frames that are to be transmitted to another network independent of the proprietary protocol used in either network. In FIG. 3A, frame 310 is transmitted from a first network and includes a protocol data unit (PDU) 308 and a VLAN tag. The VLAN tag includes a TPID value of 0x8100 and a VLAN ID of 100. The TPID value of 0x8100 is configured by the carrier associated with the first network. Each of the ports of the Ethernet exchanger 100 is associated with a TPID value that matches with the TPID of the carrier that is associated with that port.

For some embodiments, the Ethernet exchanger 100 keeps the value of the PDU 308 intact throughout the translation process. When the frame 301 is received, the TPID portion of the frame 301 is stripped and a Multiprotocol Label Switching (MPLS) label 307 is added. This is illustrated as frame 302. The positions of the MPLS data 307 and the PDU 308 in the frame 302 are then switched, as illustrated in frame 303. The Ethernet exchanger 100 then forward the frame 303 by making switching decisions based on the MPLS label 307. The frame 303 is then transmitted across a virtual circuit to a destination port where the Ethernet exchanger 100 replaces the MPLS label 307 with the TPID associated with the destination port. As illustrated with frame 304, the TPID value has been translated to 0x88a8 and the VLAN ID has been translated to 200. The TPID value of 0x88a8 is configured by a carrier associated with a second network. The translated frame is then transmitted from the Ethernet exchanger 100 to the second network as frame 305.

Figure 3B:
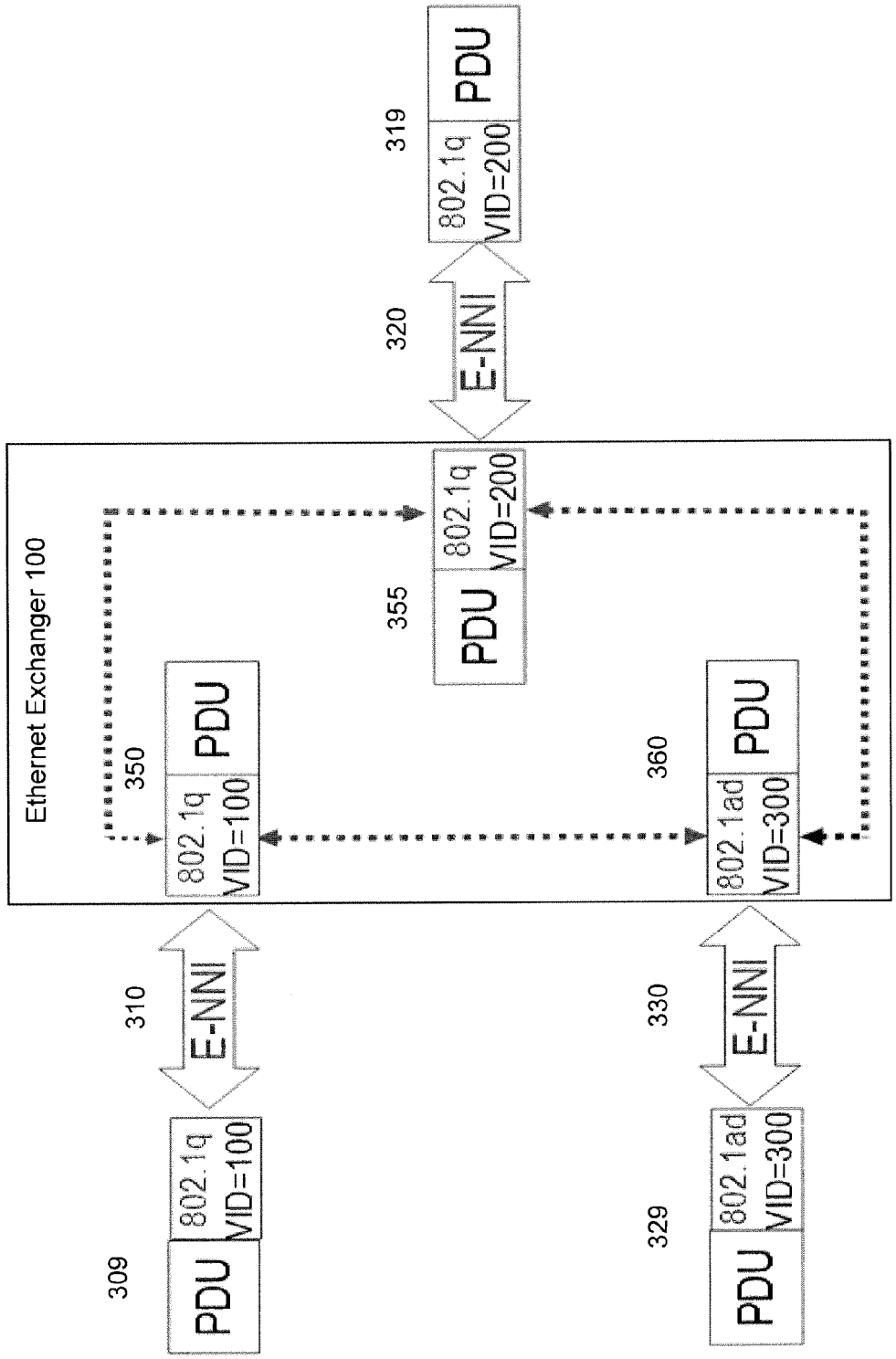
FIG. 3B is a block diagram that illustrates another example of Ethernet frame translation with multiple connections, in accordance with some embodiments.

FIG. 3B is a block diagram that illustrates another example of Ethernet frame translation with multiple connections, in accordance with some embodiments. In this example, the Ethernet exchanger 100 translates frames from three different carriers via E-NNI 310, 320 and 330. Frames 309 and 319 are associated with a similar Ethernet type 802.1q, whereas frame 329 is associated with Ethernet type 802.1 ad. Similar to the example illustrated in FIG. 3A, as these frames (shown as frames 350, 355 and 360) are received at their respective receiving ports, the frame type and frame ID portion is removed and replaced by MPLS label (or MPLS frame). Their PDU portions remain the same. They are then sent across the appropriate virtual circuits. The translation is completed when the MPLS labels are replaced by the frame information associated with the port at the receiving end.

Figure 3C:
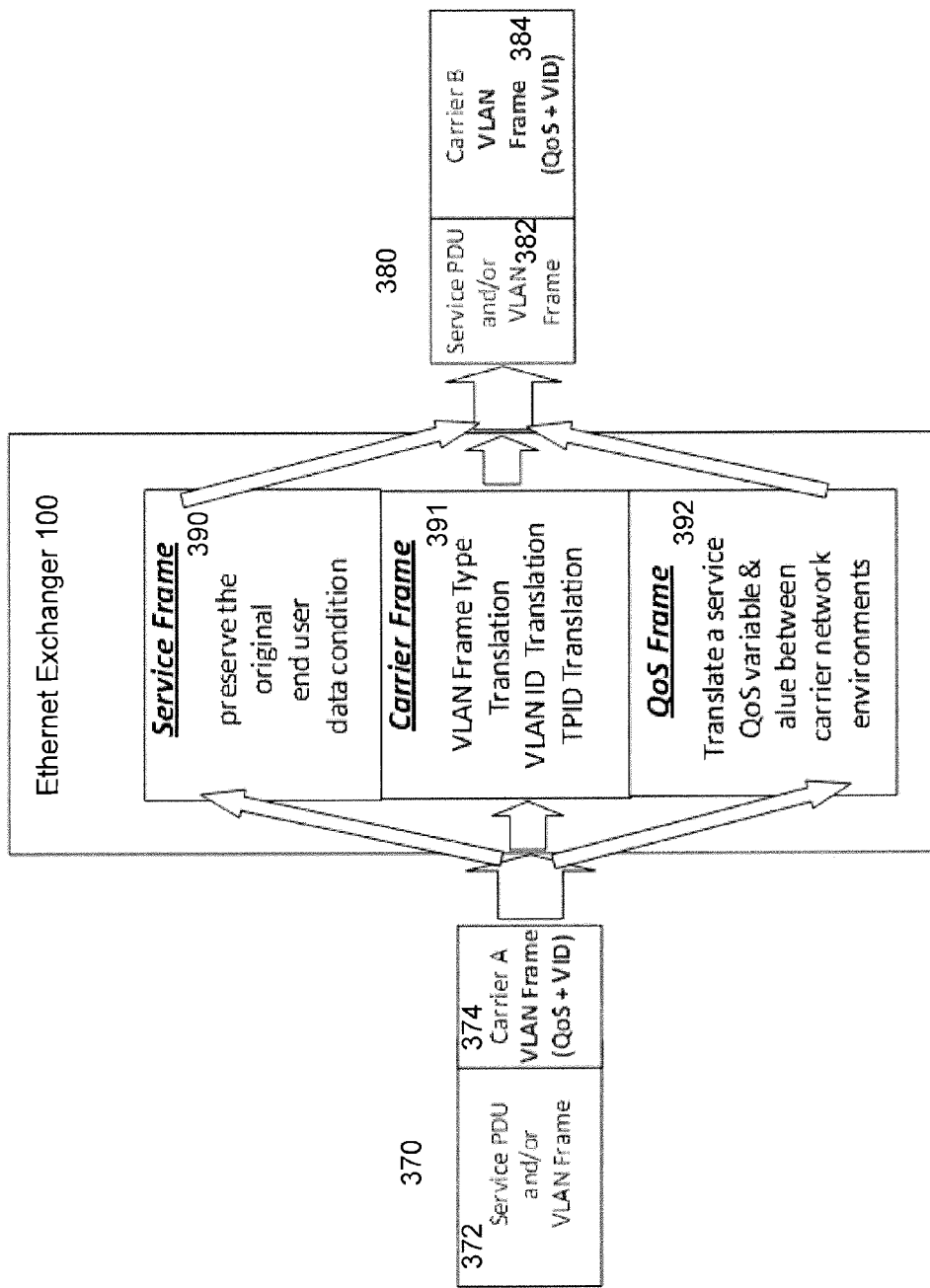
FIG. 3C is a block diagram that illustrates translation of quality of service variable, in accordance with some embodiments.

FIG. 3C is a block diagram that illustrates translation of quality of service variable, in accordance with some embodiments. In order to provide consistent quality of service (QoS) across multiple networks by different carriers, the Ethernet exchanger 100 needs to be able to translate a QoS variable from one carrier to a QoS variable from another carrier. For some embodiments, a frame from a carrier may be viewed as having three frame components: a service frame, a carrier frame, and a QoS frame. The Ethernet exchanger 100 may translate the information from the frame 370 into a service frame 390, a carrier frame 391 and a QoS frame 392. The service frame 390 may include the end user data. The carrier frame 391 may include information about the frame type, VLAN ID and TPID as translated by the Ethernet exchanger 100. The QoS frame 392 may include service variable as translated by the Ethernet exchanger 100 from a QoS used in the first network to a QoS used in the second network.

It may be noted that the frame portion 372 of the frame 370 is similar to the frame portion 382 of the frame 380. However, the frame portion 374 of the frame 370 is translated into the frame portion 384 of the frame 380. This reflects the translation of the QoS between the two networks. For some example embodiments, each carrier is required to enter QoS information about their networks using the web portal. When two carriers enter into an agreement, each of the carriers may need to use the web portal to indicate to the Ethernet exchanger 100 which of the QoS to use.

Figure 4:
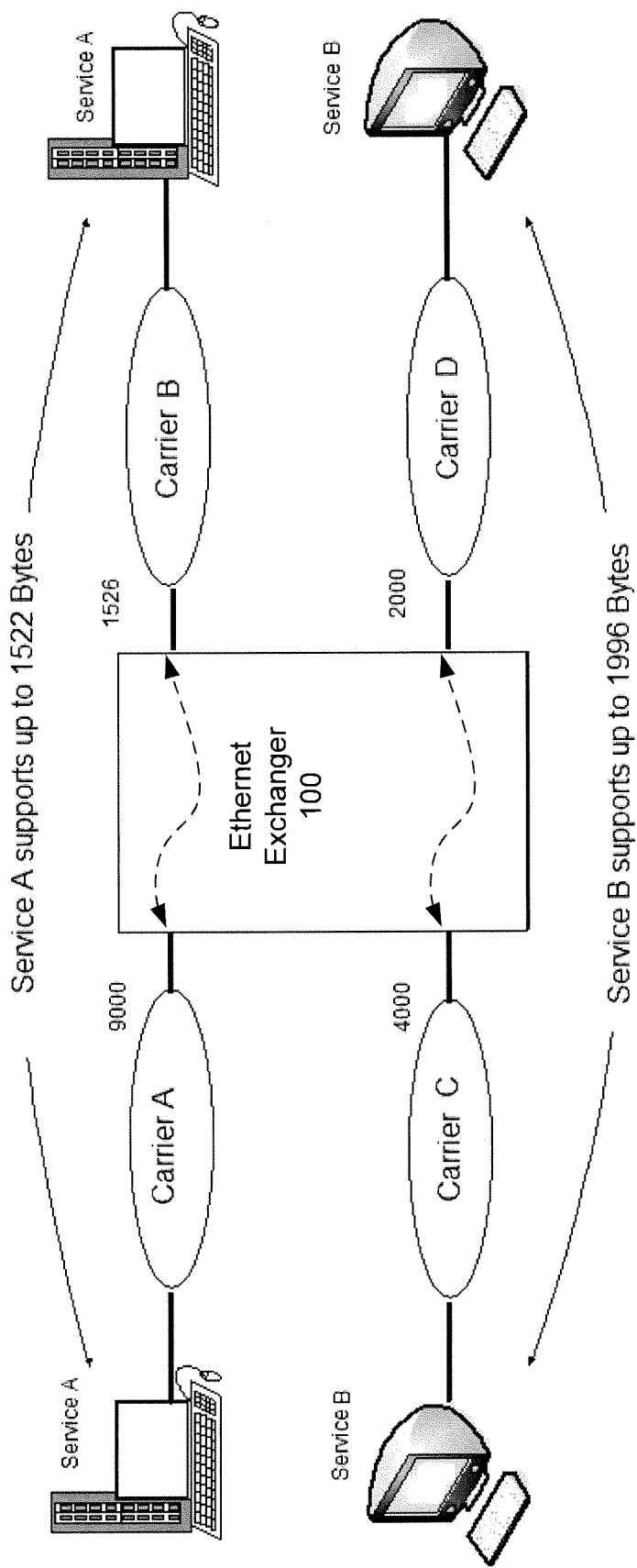
FIG. 4 illustrates an example of frame size adaptation as configured in an Ethernet exchanger, in accordance with some embodiments.

FIG. 4 illustrates an example of frame size adaptation as configured in an Ethernet exchanger, in accordance with some embodiments. Each carrier's network may have a different MTU. The MTU may be set by the carrier's network administrator, and it represents a largest frame (or packet) size in bytes that a carrier's network can transmit. For some embodiments, when the Ethernet exchanger 100 transmit a frame originating from one carrier network to another carrier network, the frame size may need to be adjusted. A frame from one carrier network that is larger than the MTU of another carrier may be divided into smaller frames. As illustrated in FIG. 4A, since the MTU of the carrier A is 9000 bytes, and the MTU of the carrier B is 1526 bytes, the service A can only be able to support up to 1522 bytes (4 bytes from the 1526 bytes is used for overhead). Similarly, since the MTU of the carrier C is 4000 bytes, and the MTU of the carrier D is 2000 bytes, the service B can only be able to support up to 1996 bytes (4 bytes from the 2000 bytes is used for overhead).

Monitoring and Trouble Shooting

Figure 5:
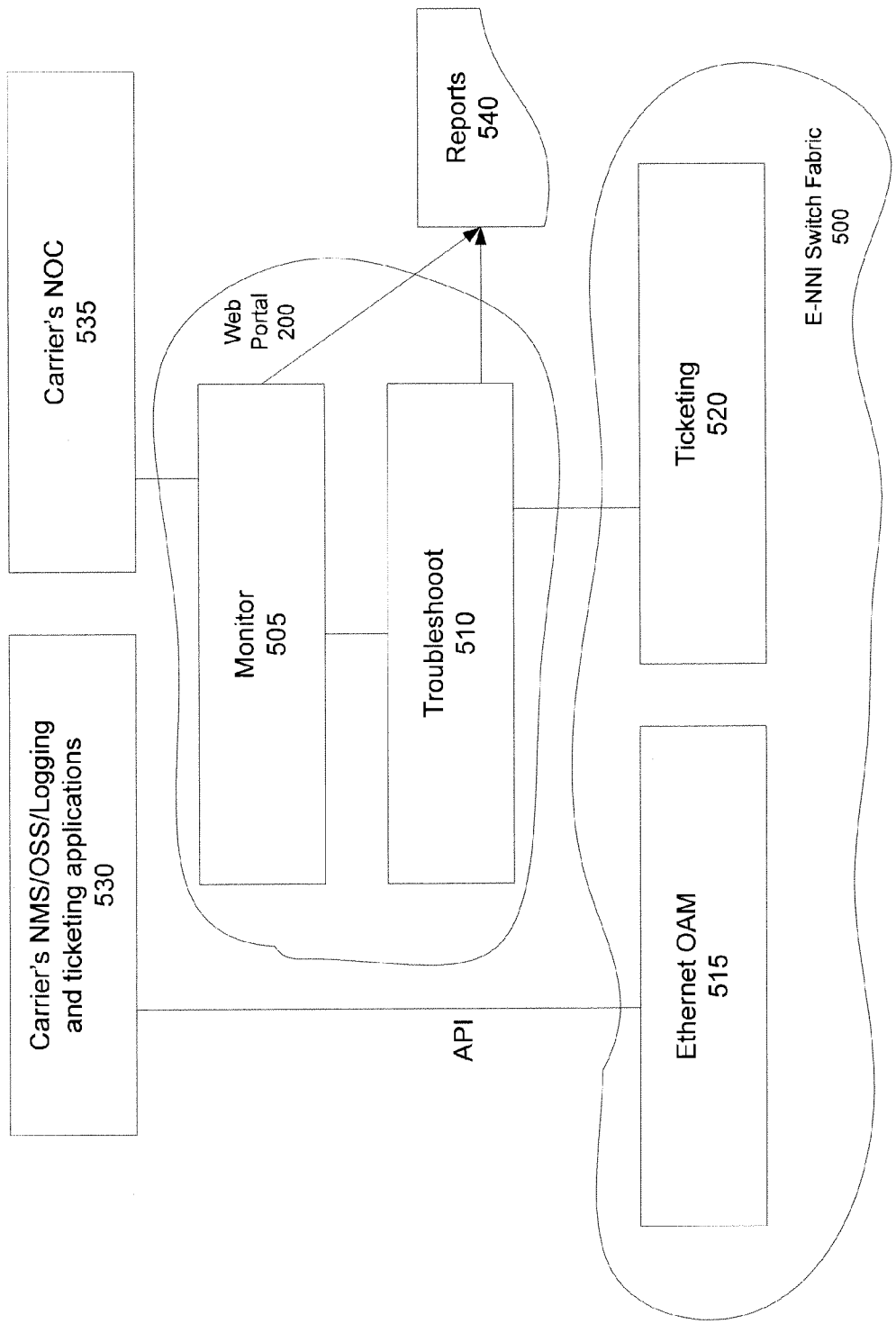
FIG. 5 is a block diagram that illustrates an example of monitoring and troubling shooting tools that may be available to the carriers, in accordance with some embodiments.

FIG. 5 is a block diagram that illustrates an example of monitoring and troubling shooting tools that may be available to the carriers, in accordance with some embodiments. The E-NNI switch fabric 500 and its Ethernet exchangers including, for example, Ethernet exchanger 100, may include scripted codes and/or hardware logic to monitor and report any potential issues that may affect the transmission of frames across the virtual circuits. For example, this may include Ethernet Operation and Maintenance (OAM) module 515 and ticketing module 520.

At the web portal level, the carriers may be able to access the monitor option 505 and the trouble shooting option 510 to interact with the Ethernet OAM module 515 and the ticketing module 520. The carriers may also be able to receive monitoring and troubleshooting reports 540. The monitor option may be used by members of the carrier's network operation center (NOC) 535 to submit tickets, test status, view link statistics, etc. For some embodiments, APIs may be available to allow the carriers' applications 530 to view monitoring and troubleshooting information and to perform other related network management operations.

For some embodiments, a carrier may be able to perform network testing that encompass its network as well as the virtual circuits that the carrier is associated with. For some embodiments, the Ethernet exchanger 100 may prevent a carrier's test from reaching beyond the virtual circuit and into another carrier's network. However, when an authorization is provided, the Ethernet exchanger is configured to provide monitoring, troubleshooting and ticketing information as related to both the virtual circuit provisioned between the first Ethernet network and the second Ethernet network as well as the first Ethernet network and the second Ethernet network themselves.

For some embodiments, the Ethernet exchanger 100 is configured to allow testing to identify issues are relating to loss of connectivity, performance, etc. The loss of connectivity issues may be identified when there is no communication from one end of a virtual circuit to another end of the virtual circuit. The issue may be caused by configuration errors, or it may be caused by physical failures. Ping test of the virtual circuit end points or intermediate points may be performed isolate the cause of the issue. The performance issues may be related to loss of frames, slow or delay delivery of frames, delay variance (or jitter), or service throughput. Other issues may be related to queuing, drops of frames, etc.

Marketplace for Potential Partners

Figure 6:
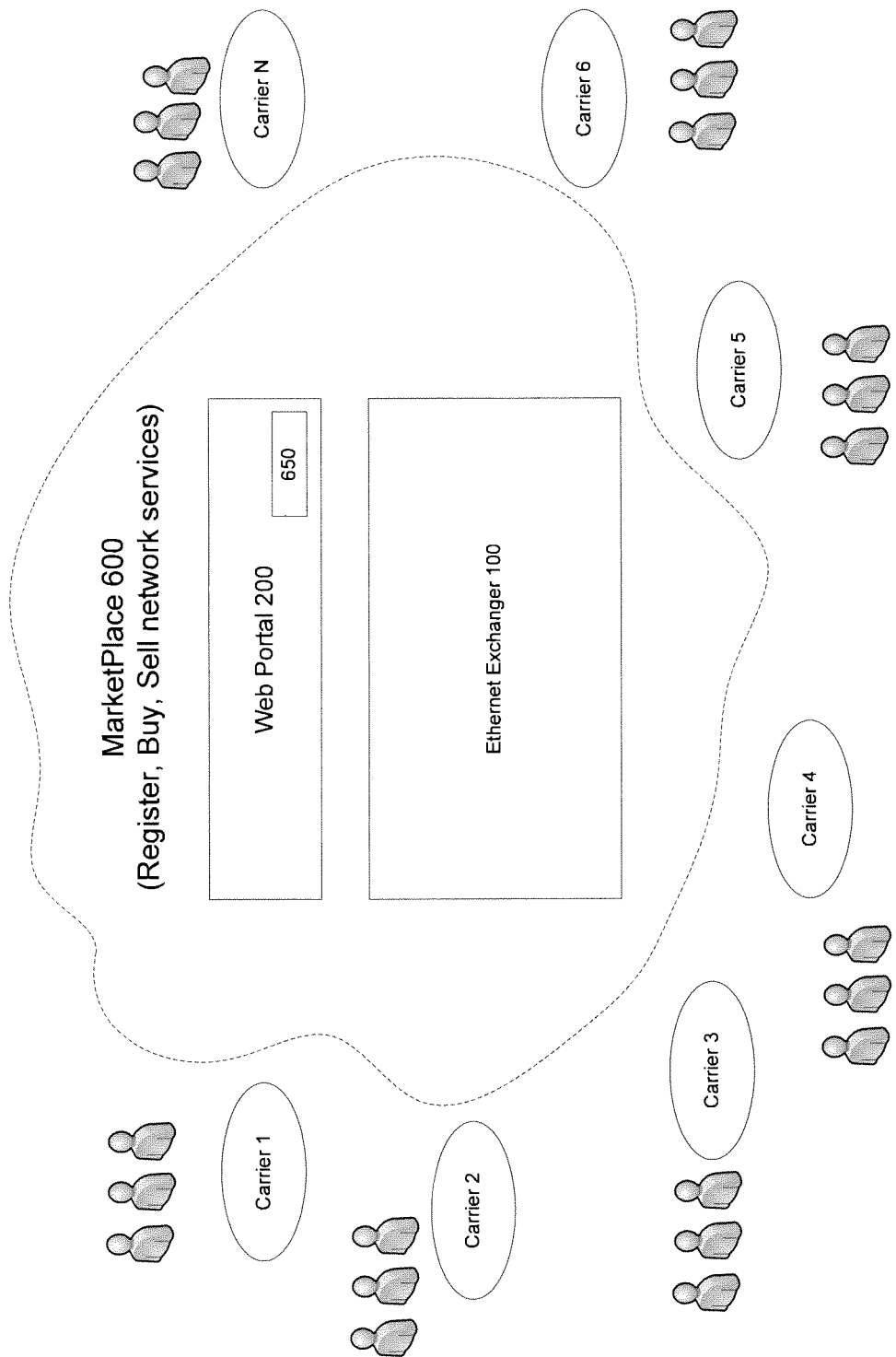
FIG. 6 is a block diagram that illustrates an example of a marketplace, in accordance with some embodiments.

FIG. 6 is a block diagram that illustrates an example of a marketplace, in accordance with some embodiments. In addition to the switch fabric platform, the combination of the services offered by the web portal 200 and the Ethernet exchanger 100 offers access to a unique and rich ecosystem of potential content and technical partners in a secure collocation facility. The Ethernet exchanger 100 is integrated with the web portal 200 to form a marketplace where the carriers can learn services offered by other carriers, qualify them and set up connections with the other carriers, the web portal 200 including a configuration module 650 to allow the carriers to publish information, find information published by other carriers, and fill out templates based on information provided by the carriers. The web portal 200 is configured to cause the Ethernet exchanger 100 to provision the virtual circuits based on the filled out templates.

The marketplace 600 allows the discovery and sale of network services among the carriers within the secure collocation facility. This enables the carriers 1 to "n" to seamlessly extend their global reach and depth. The market for the many-to-many E-NNIs is driven by the needs of carriers to extend their Ethernet services beyond the physical footprint or capabilities of their asset or infrastructure. The marketplace 600 is designed to bring carriers together and interconnect their networks regardless of the platforms (e.g., Ethernet, MPLS, SASS, etc). Using the marketplace 600, the carriers can search and review services offered by other carriers, selectively identify services that meet their requirements and negotiate purchases with the desired carriers. FIG. 9 illustrates an overall example diagram of a representation of a marketplace that includes a web portal and an External Network-to-Network Interface (E-NNI), in accordance with some example embodiments. The example illustrates the integration of the web portal and its functionalities, the ENNI infrastructure and its functionalities, the roles of the representatives of the carriers, and type of data generated based on the interactions between the representatives of the carriers and the portal infrastructure as well as the ENNI infrastructure, along with other relevant information.

Flow Diagrams

Figure 7A:
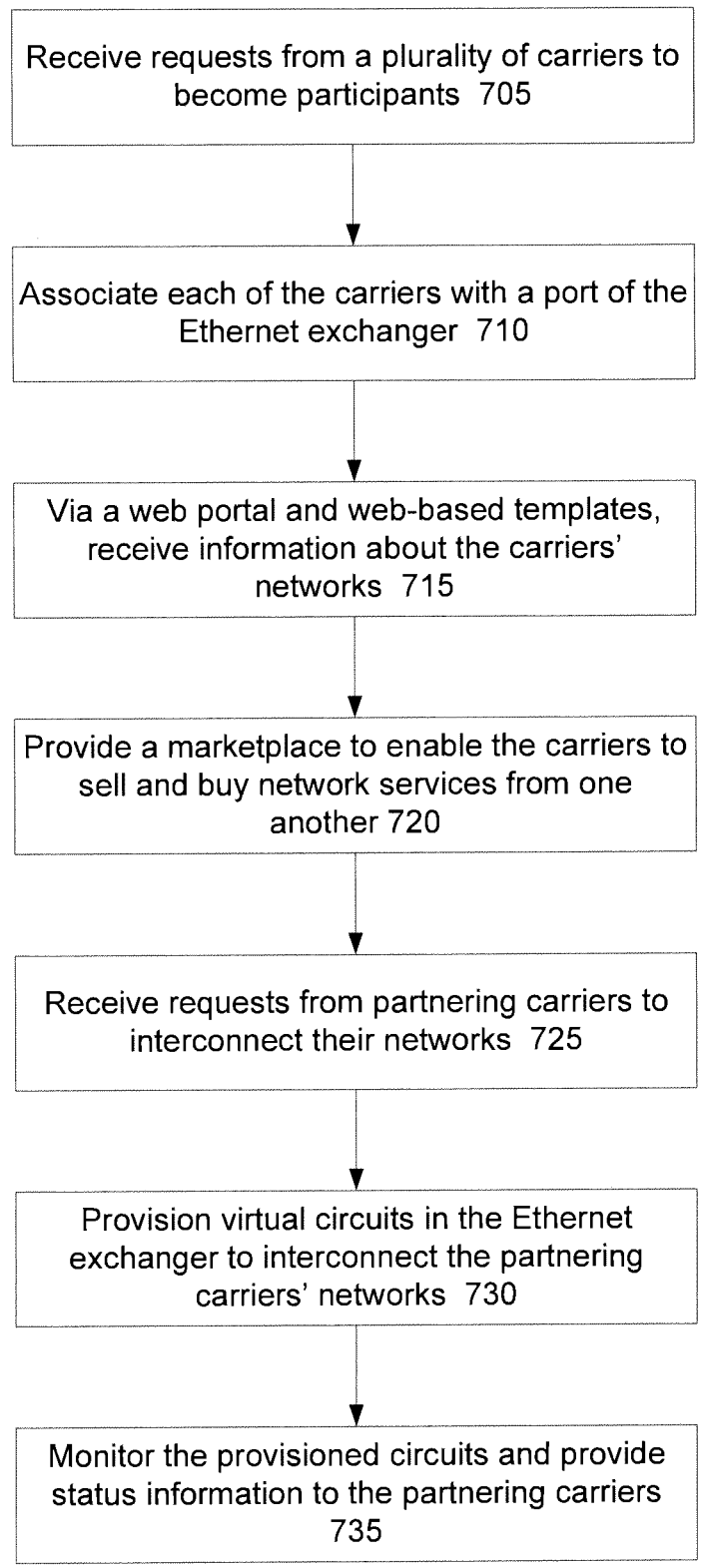
FIG. 7A is an example flow diagram that illustrates a process of providing interconnectivity services to the carriers, in accordance with some embodiments.

FIG. 7A is an example flow diagram that illustrates a process of providing interconnectivity services to the carriers, in accordance with some embodiments. At block 705, requests to become participants may be received from a plurality of carriers. The requests may be received via the web portal 200. At block 710, each carrier is qualified and associated with a port of the Ethernet exchanger 100. At block 715, information about the networks of the carriers is received. The information may be received via the web portal 200 and its web templates. It may be noted that the operations described in blocks 710 and 715 may be interchanged depending on the implementation.

At block 720, the services that the carriers want to showcase to other carriers may become accessible in a marketplace. The marketplace may also provide mechanism to enable the carriers who have network requirements to post them. As mentioned above, for some embodiments, this posting of the requirements may be in the form of an RFQ, and the RFQ may be sent to the appropriate carriers who offer network services that match with the requirements. The marketplace also provides each carrier to have a storefront so that their network services can be displayed, searched, viewed and ordered by other carriers.

Based on the carriers becoming partners, they may generate requests to have the connections established, as shown in block 725. At block 730, the Ethernet exchanger 100 provisions the virtual circuits to connect the networks of the requesting carriers. At block 735, the virtual circuits are monitored for potential issues and appropriate status information is provided to the carriers.

Figure 7B:
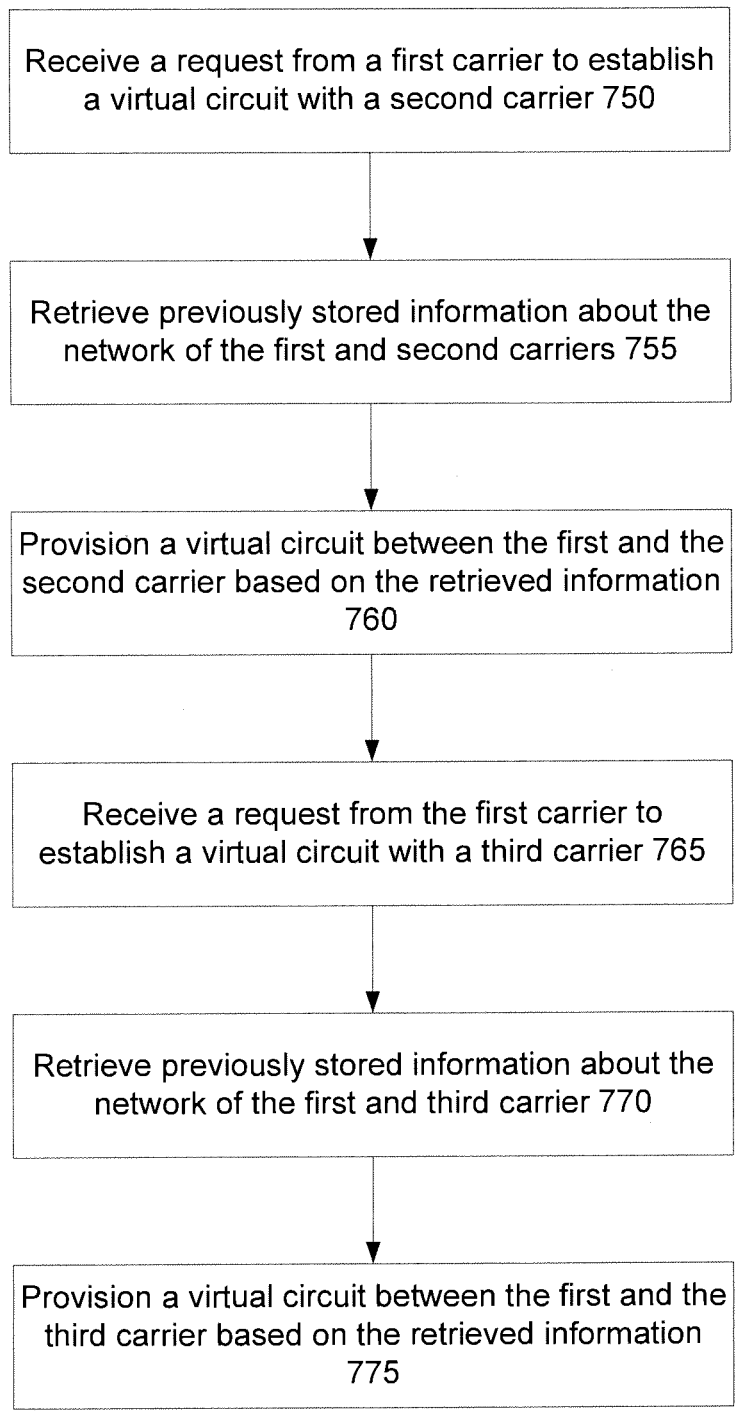
FIG. 7B is an example flow diagram that illustrates a process of reusing existing carrier's information to establish multiple virtual circuits, in accordance with some embodiments.

FIG. 7B is an example flow diagram that illustrates a process of reusing existing carrier's information to establish multiple virtual circuits, in accordance with some embodiments. At block 750, a virtual circuit request is received to establish a virtual circuit between a first carrier and a second carrier. At block 755, information about the first carrier and the second carrier is retrieved from a database. The information was provided by the first and second carriers as part of them becoming a participant. At block 760, a first virtual circuit is provisioned.

At block 765, another virtual circuit request is received to establish a virtual circuit between the first carrier and a third carrier. At block 770, information about the first carrier and the third carrier is retrieved from the database. It is noted that there is no need for the first carrier to provide the same information again for this request. The same information stored in the database for the first carrier is reused. The information about the third carrier was also provided when it became a participant. At block 775, a second virtual circuit is provisioned.

Figure 7C:
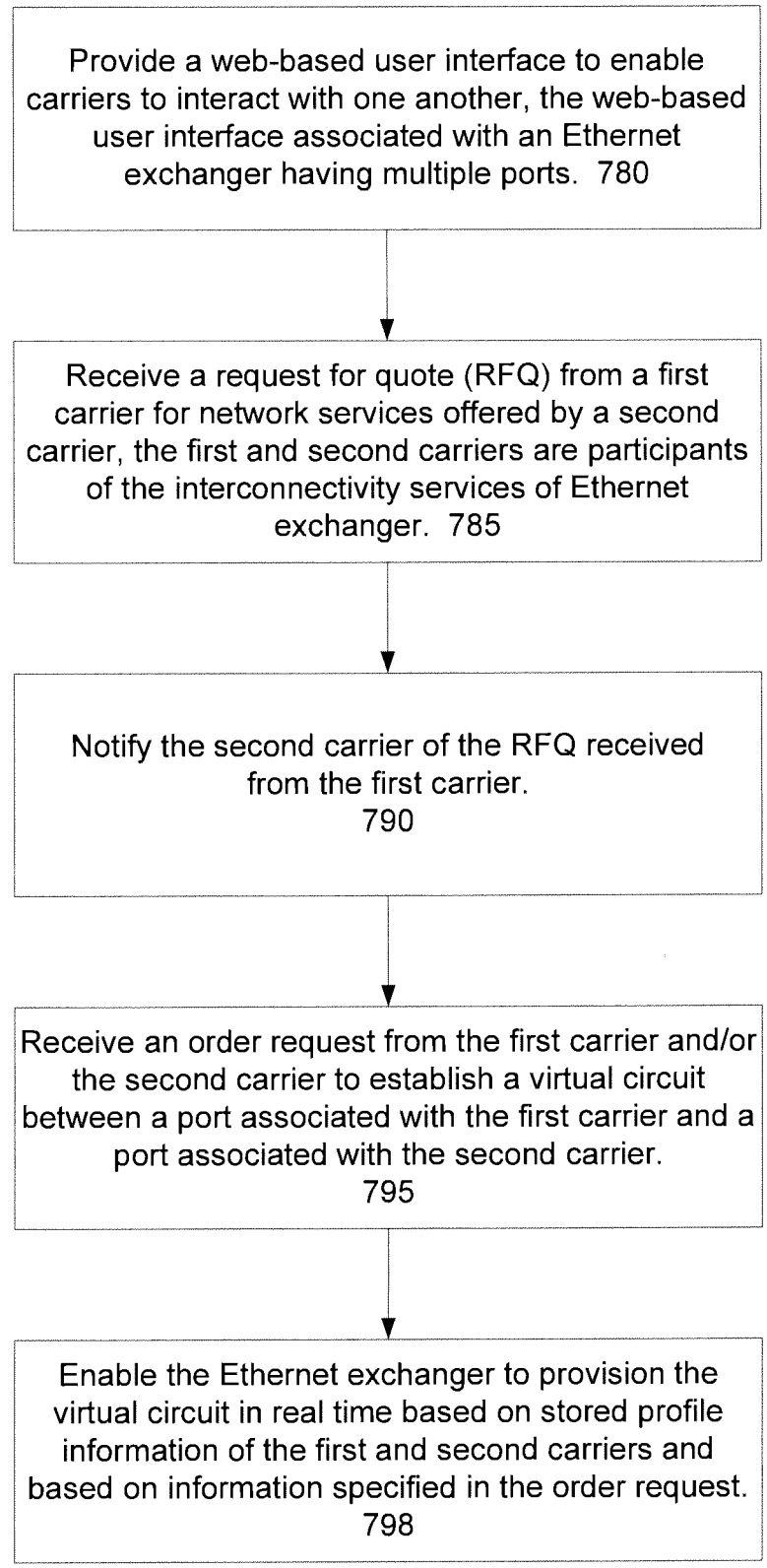
FIG. 7C is an example flow diagram that illustrates a process of facilitating partnership among the carriers, in accordance with some embodiments.

FIG. 7C is an example flow diagram that illustrates a process of facilitating partnership among the carriers, in accordance with some embodiments. At block 780, a web portal is provided to enable the carriers to interact with one another. The web portal is associated with an E-NNI infrastructure that includes a switch fabric and one or more Ethernet exchangers. The web portal includes options to enable a first carrier to submit a quote request (or RFQ) for network services to a second carrier. Both the first and the second carrier have already registered and become participants of the services offered by the web portal and the underlying E-NNI infrastructure. At block 785, the quote request is received from the first carrier. At block 790, the quote request is sent to the second carrier. The second carrier may review the quote request, provide a solution, and come to terms with the first carrier independent of the web portal.

At block 795, a request to establish a virtual circuit between the first and the second carriers is received. At block 798, the provisioning and configuration of the virtual circuit is performed based on the information stored for the first and the second carriers and based on any additional information provided with the request.

System Diagram

Figure 8:
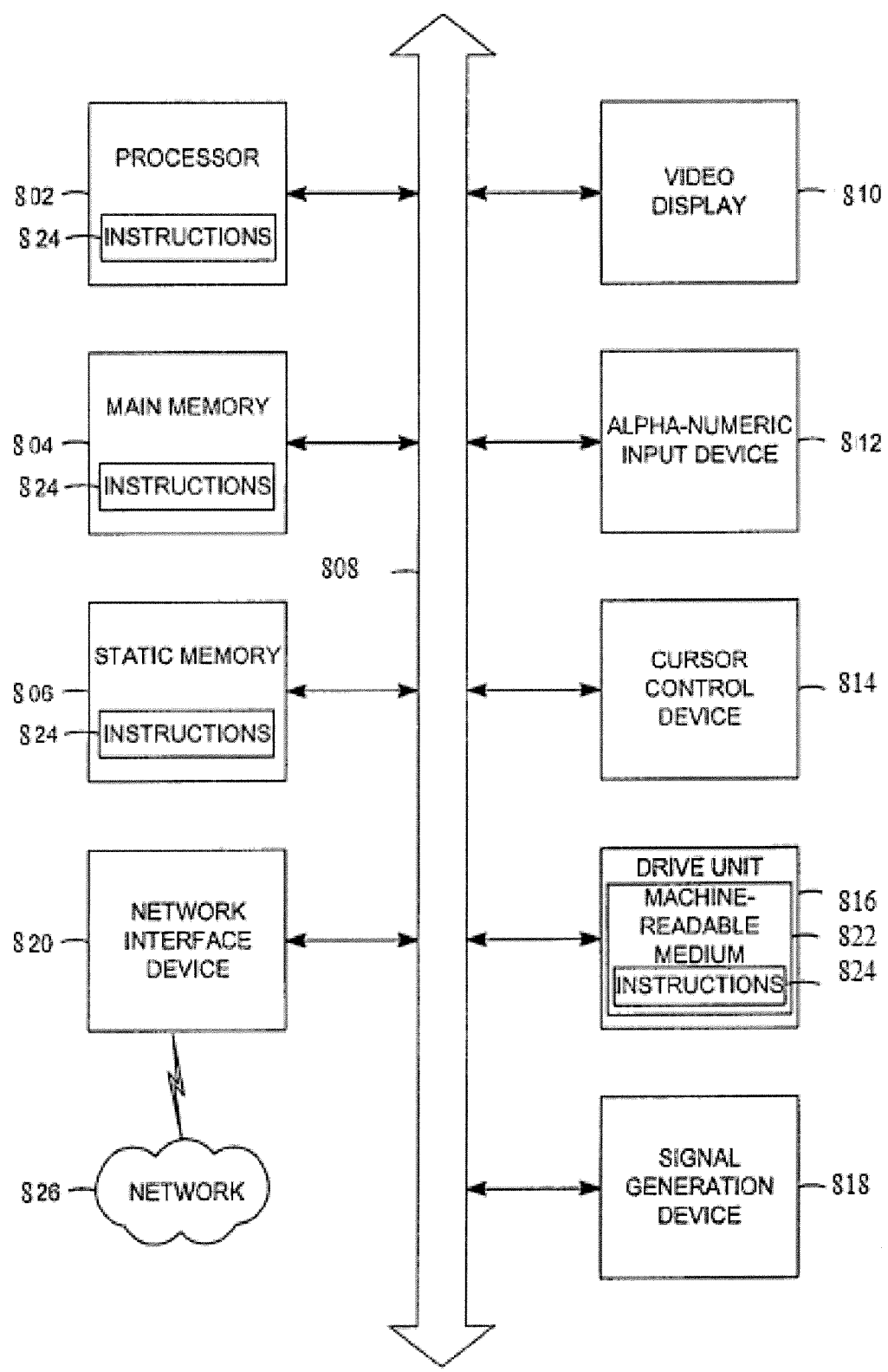
FIG. 8 illustrates an example diagram of a representation of a machine in the example form of a computer system that may be used, in accordance with some example embodiments.

FIG. 8 illustrates an example diagram of a representation of a machine in the example form of a computer system that may be used, in accordance with some example embodiments. As an example, computer system 800 may be a client computer system or machine used by a carrier to access the web portal 200. As another example, the computer system 800 may be a computer system where programs associated with the web portal 200 may be stored and executed.

A set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

In the current example, computer system 800 may include a processor 802 (e.g., a central processing unit (CPU), a graphics processing unit (GPU), or both), a main memory 804 and a static memory 806, which communicate with each other via a bus 808. The computer system 800 may further include a video display unit 810 (e.g., liquid crystals display (LCD) or a cathode ray tube (CRT)). The computer system 800 also includes an input device 812 (e.g., a keyboard), a cursor control device 814 (e.g., a mouse), a disk drive unit 816, a signal generation device 818 (e.g., a speaker) and a network interface device 820.

The disk drive unit 816 includes a machine-readable medium 822 on which is stored one or more sets of instructions (e.g., software 624) embodying any one or more of the methodologies or functions described herein. The instructions 824 may also reside, completely or at least partially, within the main memory 804, the static memory 806, and/or within the processor 802 during execution thereof by the computer system 800. The main memory 804 and the processor 802 also may constitute machine-readable media.

The instructions 824 may further be transmitted or received over a network 826 via the network interface device 820. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In example embodiments, a computer system (e.g., a standalone, client or server computer system) configured by an application may constitute a "module" that is configured and operates to perform certain operations as described herein below. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical and magnetic media, and carrier wave signals.

As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages such as C, C+, or other similar languages. Also, an algorithm may be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure.

Thus, what has been described is a neutral platform and marketplace for carriers and service providers. The platform enables the carriers to extend their network footprint cost effectively and to speed time to market by partnering and interconnecting with other carriers. The marketplace provides the carriers access to wholesale and retail channels. Using a web portal of the marketplace, the carriers can monetize assets by marketing their services and forming partnerships with other carriers. It may be appreciated that FIGS. 1-9 are merely representational and may not be drawn to scale. Certain proportions thereof may be exaggerated, while others may be minimized. Accordingly, the specification and drawings are to be regarded in an illustrative rather than a restrictive sense.

What is claimed is:

1. An apparatus comprising:
   an Ethernet exchanger coupled to two or more Ethernet networks to exchange information among the two or more Ethernet networks using virtual circuits, where the Ethernet exchanger is configured to perform translation services between the two or more Ethernet networks including protocol handshaking, bandwidth requirements, and quality of service (QoS), independent of the type of Ethernet service or network configuration parameters used in either Ethernet network,
   wherein a first Ethernet network is associated with a first carrier and has wiring of that first Ethernet network connected up to a first port of the Ethernet exchanger, and a second Ethernet network is associated with a second carrier and has wiring of that second Ethernet network connected up to a second port of the Ethernet exchanger,
   wherein network information of the first Ethernet network and network information of the second Ethernet network are provided by the respective first carrier and the second carrier through one or more templates presented by an online web portal cooperating with a physical switch fabric of the Ethernet exchanger and stored in a searchable relational database, wherein a virtual circuit is provisioned to cross connect the first Ethernet network and the second Ethernet network based on a partnership between the first carrier and the second carrier and based on the stored information about the first network and the second network, the virtual circuit associated with the first port and the second port, and wherein the stored information about the first network or the second network is reusable for subsequent provisioning of other virtual circuits for the first carrier or the second carrier.

2. The apparatus of claim 1, wherein the first Ethernet network and the second Ethernet network are coupled to the Ethernet exchanger via network-to-network interfaces (NNI).

3. The apparatus of claim 2, wherein the information about the first Ethernet network and the second Ethernet network is received based on one or more templates presented by an online web portal cooperating with a physical switch fabric of the Ethernet exchanger to one or more users from the first carrier, the second carrier, or both on that user's client machine, wherein the templates solicit carrier information and direct that solicited information into fields of the relational database.

4. The apparatus of claim 3, wherein the Ethernet exchanger is configured to enable the two or more Ethernet networks to be connected with one another using a one-to-many topology or many-to-many topology, and wherein the relational database is to aggregate the carrier information from all of the Ethernet networks connected to the Ethernet exchanger.

5. The apparatus of claim 3, wherein to exchange information between the first Ethernet network and the second Ethernet network, the Ethernet exchanger is configured to perform virtual local area network (VLAN) identifier (ID) translation, maximum transmission unit (MTU) adaptation and VLAN tag protocol identifier (TPID) translation and is configured to perform VLAN frame translation, bandwidth translation and QoS mapping based on the information associated with the first Ethernet network and the second Ethernet network acquired via the templates and extracted into the relational database, and wherein a coded routine is configured to extract the information from the templates into the fields of the relational database.

6. The apparatus of claim 5, wherein the Ethernet exchanger is configured to preserve protocol data unit (PDU) portion of frames received from the first Ethernet network or the second Ethernet network, while translating the VLAN ID, the MTU adaptation, the VLAN TPID translation, the VLAN frame translation, the bandwidth translation and the QoS mapping.

7. The apparatus of claim 5, wherein the Ethernet exchanger is configured to provide monitoring, troubleshooting and ticketing information as related to both the virtual circuit provisioned between the first Ethernet network and the second Ethernet network as well as the first Ethernet network and the second Ethernet network themselves.

8. The apparatus of claim 7, wherein the Ethernet exchanger is configured to provide the monitoring, troubleshooting and ticketing information using the online web portal and application programming interfaces (APIs).

9. The apparatus of claim 1, wherein the Ethernet exchanger is integrated with the online web portal, and wherein the first carrier and the second carrier can use a template of the online web portal to generate a request for quote (RFQ) for the virtual circuit, and wherein users of the first carrier and the second carrier can create customer accounts with their information, and once entered into the relational database, the information from the customer account stored in the relational database is used to populate fields of the RFQ.

10. The apparatus of claim 9, wherein the Ethernet exchanger has a provisioning module coded to provision a virtual circuit between the first Ethernet network and the second Ethernet network based on information in a virtual circuit request and information stored in the relational database, where non-pre-populated information entered into the virtual circuit request is extracted and stored in the relational database, and then the information in the virtual circuit request along with the information already known and stored about the first Ethernet network and the second Ethernet network is used by the provisioning module to create the virtual circuit between the first Ethernet network and the second Ethernet network.

11. The apparatus of claim 9, wherein the online web portal is configured to enable the first carrier and the second carrier to create unique customer accounts and to showcase network information to other carriers using one or more templates, wherein the one or more templates include fields that correspond to fields of records that are stored in the relational database, and wherein the network information comprises lit building lists, detailed services description and QoS guarantees.

12. The apparatus of claim 3, wherein the online web portal is configured to enable the first and the second carriers to qualify, search for potential partners, buy services, sell services and order services.

13. The apparatus of claim 1, wherein the Ethernet exchanger is configured as an interconnection service that aggregates and translates private Ethernet services via templates and applied through the online web portal integrated with the physical switch fabric of the Ethernet exchanger, where the Ethernet exchanger provides a many-to-many Layer 2 Network-to-Network Interface (NNI) in which multiple carriers, each having its own Ethernet network, connect to their own port on the Ethernet exchanger and are interconnected with other carriers also connected to the Ethernet exchanger, and wherein the Ethernet exchanger and the online web portal cooperate to standardize the network-to-network connection process.

14. The apparatus of claim 1, wherein the Ethernet exchanger is configured as a transparent aggregation translator between the first and the second Ethernet networks, wherein the online web portal hosted on a server presents templates to a user on a client machine to allow the user to create a profile for the first carrier or the second carrier, the profile including services offered, wherein a configuration module extracts information from the templates and store this information in the relational database, and wherein profile information from all of the users is aggregated to provide complete and relevant information in response to a search query into the online web portal, wherein the database has one or more intelligent routines to discover the queried information and to present the aggregated information relevant to the query of the user to the user, wherein the aggregated information includes a list of a carrier's lit buildings, capacity, price, and service level, and wherein the relational database is configured to store contents from those templates, aggregate the stored contents and make the aggregated information searchable and publishable.

15. The apparatus of claim 1, wherein the Ethernet exchanger is integrated with the online web portal to form a marketplace where the carriers can learn services offered by other carriers, qualify them and set up connections with the other carriers, the online web portal including a configuration module to allow the carriers to publish information, find information published by other carriers, and fill out templates based on information provided by the carriers, wherein the online web portal is configured to cause the Ethernet exchanger to provision the virtual circuits based on the filled out templates.

16. A method comprising:
retrieving stored profile information for a first carrier and a second carrier based on receiving a request to provision a virtual circuit to connect an Ethernet network of the first carrier with an Ethernet network of the second carrier, wherein the virtual circuit is to be provisioned by a switch fabric having interconnectivity capability, and wherein the stored profile information for the first carrier and the second carrier is collected using one or more templates associated with a web-based user interface;
provisioning the virtual circuit based on the stored profile information for the first carrier and the second carrier;
translating frames to be transmitted between the first Ethernet network and the second Ethernet network, wherein said translating includes converting Ethernet frames into Multiprotocol Label Switching (MPLS) frames while transiting across the virtual circuit, performing frame adaptation based on maximum transmission unit (MTU) of the first and second Ethernet networks, mapping quality of services (QoS) between the first and second Ethernet network and preserving protocol data unit (PDU) portion of frames received from the first and second Ethernet network; and
providing monitoring and troubleshooting information using the web-based interface and application programming interfaces (APIs).

17. The method of claim 16, further comprising using the web-based user interface to enable the first carrier and the second carrier to be qualified, to sell or buy network services, to generate request for quote (RFQ), to provide solutions to the RFQ, and initiate provisioning requests.

18. The method of claim 16, wherein the profile information of the first carrier and the second carrier is stored in a relational database and is to be reused when another virtual circuit is to be provisioned for the respective first carrier or second carrier.

19. A system comprising:
means for requesting profile information and storing the profile information of a first carrier and a second carrier using one or more templates presented by an online web portal, the profile information including information about their respective Ethernet networks;
means for enabling the first carrier and the second carrier to generate a request for service and to provide a solution to the request for service;
means for enabling the first carrier and the second carrier to place an order for a virtual circuit to connect their Ethernet networks;
means for provisioning the virtual circuit between a port associated with the first carrier and a port associated with the second carrier in a switch;
means for translating frames to be transmitted between the first and second Ethernet network; and
means for enabling the first carrier or the second carrier to place an order for another virtual circuit without the first carrier or the second carrier having to provide its profile information a second time.

20. The system of claim 19, further comprising means for the first carrier and the second carrier to monitor and troubleshoot issues related to the virtual circuit.

* * * * *